United States Patent [19]

Singh

[11] 4,363,221
[45] Dec. 14, 1982

[54] WATER HEATING SYSTEM HAVING A HEAT PUMP

[76] Inventor: Kanwal N. Singh, 720 Grandview Ave., Columbus, Ohio 43215

[21] Appl. No.: 234,820

[22] Filed: Feb. 17, 1981

Related U.S. Application Data

[63] Continuation of Ser. No. 67,615, Aug. 20, 1979, abandoned.

[51] Int. Cl.³ .............................................. F25B 27/02
[52] U.S. Cl. .................................. 62/238.6; 62/324.4
[58] Field of Search ....................... 62/183, 238.6, 506, 62/324.4

[56] References Cited

U.S. PATENT DOCUMENTS

| | | | |
|---|---|---|---|
| 2,125,842 | 8/1938 | Eggleston | 62/238.6 |
| 2,375,157 | 5/1945 | Wilkes et al. | 62/238.6 |
| 3,188,829 | 6/1965 | Siewert et al. | 62/324.4 |
| 3,301,002 | 1/1967 | McGrath | 62/238.6 |
| 3,308,877 | 3/1967 | Gerteis | 62/324.4 |
| 3,366,166 | 1/1968 | Gerteis | 62/324.4 |
| 3,989,183 | 11/1976 | Gustafsson | 62/238.6 |
| 4,165,037 | 8/1979 | McCarson | 62/238.6 |
| 4,226,604 | 10/1980 | Weis | 62/238.6 |
| 4,226,606 | 10/1980 | Yaeger et al. | 62/238.6 |

Primary Examiner—Lloyd L. King
Attorney, Agent, or Firm—Robert E. Stebens

[57] ABSTRACT

A water heating system for residential use is provided having a heat pump solely for producing heat energy to heat water. The system includes an insulated storage tank interconnected in a water system and the tank may be provided with secondary heating means such as electric resistance elements for effecting heating of the water in the event that the heat pump is unable to produce sufficient heat as a consequence of ambient environment temperature conditions or if the heating demands exceed the heat pumps capability. A water circulating conduit is connected with the tank and is coupled with the heat pump by a heat exchanger. Positive circulation of water in the conduit is obtained by a pump interconnected therein. A temperature regulating flow control valve may be included in the circulating conduit to result in the water leaving the circulating conduit and either returning to the tank or entering the water system at the maximum desired temperature. A modified form of the system includes a vertically configured heat exchanger which is particularly capable of effecting circulation of water through inducing of thermally convective current.

16 Claims, 7 Drawing Figures

WATER HEATING SYSTEM HAVING A HEAT PUMP

This application is a continuation of application Ser. No. 67,615, filed Aug. 20, 1979, and which application is now abandoned.

BACKGROUND OF THE INVENTION

This invention is directed generally to a water heating system and is specifically directed to that type of system utilized in residential households, although the system can be adapted to commercial usage. The system is uniquely designed and adapted for utilization with relatively small capacity hot water systems which may have a storage tank capacity in the order of thirty to two hundred gallons.

Water heating systems presently utilized are generally of an electrically heated type or of a combustion type having a burner which is fueled by either natural gas or oil. The types of water heating systems utilizing electrical power generally include one or two electrical resistance heating elements and temperature control systems are provided to operate those heaters in accordance with the temperature of the water within the storage tank. Usually, if two such heaters are provided, they are placed at relatively vertically spaced positions and are interconnected with an electrical control system which enable operation of the units to most effectively provide heating of the water. These water storage tanks also have cold water inlets and hot water outlets with the cold water normally entering at the bottom of the tank. This is to obtain the advantages of a thermal convection distribution of water within the tank and thus the hottest water will be at the upper end of the tank where it is first withdrawn for use. Accordingly, a heating element located near the bottom, or within a bottom zone of the tank, will be effective in heating the cold water as it is initially drawn into the tank and prior to its mixing with previously heated water that is still retained within the tank as a result of water flow occasioned by use of hot water in the system. The advantageous objective is to attempt to maintain a previously heated portion of the water at the desired elevated temperature so that there is at least some heated water available for immediate use while the system is recovering from a prior water use.

There have been numerous recent attempts to design and develop hot water heating systems that can efficiently and effectively utilize heat pump systems of the type which are being used for space heating purposes. An example of such a system is illustrated in U.S. Pat. No. 4,098,092 granted on July 4, 1978 to Kanwal N. Singh who is also the inventor of the hot water heating system disclosed herein. The system disclosed in that patent is designed to provide space heating or cooling of a residence with a by-product use being that of heating water for use in the water system of the residence. The system as disclosed in that patent to effect the heating of the water merely comprises providing of an additional water storage tank with a heat exchanger coupled with a heat pump system to provide a transfer of heat to the water when the situation warranted the utilization of the heat pump.

While the system, as disclosed in the cited patent, does provide the advantageous obtaining of heat for the heating of water, the system is not as fully efficient as is desired to effectively and efficiently utilize electrical power. The location and arrangement of a heat exchanger within the water tank, wherein the refrigerant fluid is caused to circulate and thus effect the heat transfer, relies on thermally convective currents developed within the tank for effecting this operation. Since thermal convective currents that may be developed within a storage tank of water are not of a rapid flow type, such systems relying on thermal convection have a relatively slow transfer of heat and the system thus disclosed in that patent is not able to attain the high efficiency of heat transfer to most effectively utilize the benefits of a heat pump system. This factor of low efficiency that is a consequence of direct immersion of a condenser/heat exchanger immersion in the water tank is also applicable to other known heat pump water heaters since they also use the direct immersion construction technique.

Another example of a combined space heating/cooling function and water heating in a residence is disclosed in U.S. Pat. No. 3,922,876 granted Dec. 2, 1975 to T. I. Wetherington, Jr., et al. That patent shows the interconnection of an air conditioner having the primary function of effecting space cooling in the residence with the water system in an attempt to conserve energy. This system has the same disadvantage as the system of U.S. Pat. No. 4,098,092 in that it is only capable of heating water during the time of its operation to provide space cooling in the residence. U.S. Pat. No. 3,188,829 issued to H. G. Siewart on June 15, 1965 also discloses a similar space heating/cooling system which has the secondary or auxiliary function of heating water for the residence. Such systems are not adequate for or capable of providing the primary source of heat for a hot water system as they are dependent on the space heating/cooling requirements or conditions for operation and those conditions are totally unrelated to the hot water requirements. Consequently, these systems will often be operating when there is no requirement for the auxiliary heating of water or they will not be operating when there is a requirement for heating of water. Furthermore, these combination systems having the primary space heating/cooling function are inefficient in their operation as to providing of heat for the water system in that the condenser heat exchanger in the water system cannot obtain all of the heat available in the refrigerant because of the existence of another condenser heat exchanger. In practical effect, this heat transfer capability is limited to about one-third of the available heat.

SUMMARY OF THE INVENTION

In accordance with this invention, an improved and more efficient water heating system using a heat pump is provided for a residential hot water system and which can be advantageously designed as an integral self-contained unit adapted for close proximate mounting in association with the water tank. The system is directly and solely responsive to the requirements for hot water and results in enhanced operational efficiency as it is able to obtain all of the heat available in the refrigerant since it has the capability of condensing 100% of the refrigerant to a liquid state. The system can be effectively constructed in a compact configuration that is readily adapted to direct mounting on the top of a water storage tank having a capacity in the range of 30 to 200 gallons. Such configuration and mounting enables the inventive system to be readily applied to existing water heaters of either the electrical or combustion types for their conversion to primary use of the more efficient heat pump system.

The heat pump system of this invention having the single function of achieving heating of the water in the residential hot water system solely in response to the needs of hot water includes a heat pump system that is coupled by a heat exchanger with a water circulating conduit system that in turn is coupled with the hot water utilization system. It is an important objective of this ivention to provide a compact and integral, self-contained heat pump system having apparatus incorporated therein for efficiently effecting circulation of the water exteriorally of the water storage tank. This arrangement results in achieving a coefficient of performance in the order of 3.6 as contrasted with a relatively lower coefficient of performance of the order of 1.3–1.5 achieved with a heat exchanger directly immersed in the water tank and relying solely on thermally induced convective currents.

In a preferred embodiment of the invention, the water circulating device is an electrically driven water pump that is interconnected in a water circulating conduit. This conduit is coupled into the water source and utilization system as well as the water tank and is operable to primarily circulate the water through the storage tank and into association with the heat pump system's heat exchanger. Two alternative modes of operation may be provided in this preferred system in that the system may either continuously circulate water in transferring heat to the water in small increments of increased water temperature during passage through the heat exchanger, or it may be operated under control of a thermostatic valve so that the water is brought up to the maximum desired temperature in one pass through the heat pump system's heat exchanger. The first mode of operation provides greater efficiency in its operation whereas the latter provides a more rapid heat recovery as to at least a predetermined minimal quantity of the water contained within the tank. The rapid heat recovery is advantageous where a large quantity of water was used and it is desired to rapidly heat at least a small quantity of water to the desired temperature for immediate use.

In a second embodiment of the invention, the heat pump system's heat exchanger is constructed so as to effect thermal convection circulation of water exteriorally with respect to the storage tank. To achieve this objective, the heat exchanger is designed to be externally mounted on a water tank and comprises a structure that extends vertically having an inlet connected to the bottom or lower zone or region of the water tank and an outlet connected to the top or upper zone or region of the water tank. The vertically extending heat exchanger configuration thus induces a thermal flow of the water for a more effective interchange of water as between the upper and lower regions of the water tank than could be otherwise expected to be achieved with a direct immersion type of heat exchanger and, consequently, is capable of achieving a substantially greater heat transfer efficiency with respect to the refrigerant.

It is also an important objective of this invention to provide a water heating system of the heat pump type which can be directly mounted on the water tank and thus utilize the heat within the building or room in which the water heater is located. A heat pump is uniquely capable of extracting heat from even a relatively low temperature air mass and provide that heat at a desired point of use. Thus, the system can function when installed in areas of a building which are not heated, such as a basement, without resulting in any substantial further decrease in the air temperature in that building space. An important advantage of having the evaporator located within the building is that it will not be subjected to the problems of adverse weather conditions such as snow or ice accumulations that must be removed to permit operation. Cost of the inventive system is thus minimized as expensive snow and ice melting components and controls are not required. When installed in living space, the system could have the benefit of providing a small amount of cooling in warmer climates. While the direct mounting of the entire unit as a compact integral structure is preferred for convenience of installation, it is also contemplated that the evaporator of the heat pump system may be incorporated in an air duct system for interconnection and extraction of heat from an external air source such as the exterior of a residential building. These and other objects of this invention will be readily apparent from the following detailed description of illustrative embodiments thereof and the accompanying drawings.

DESCRIPTION OF THE ILLUSTRATIVE EMBODIMENTS

Figure 1:
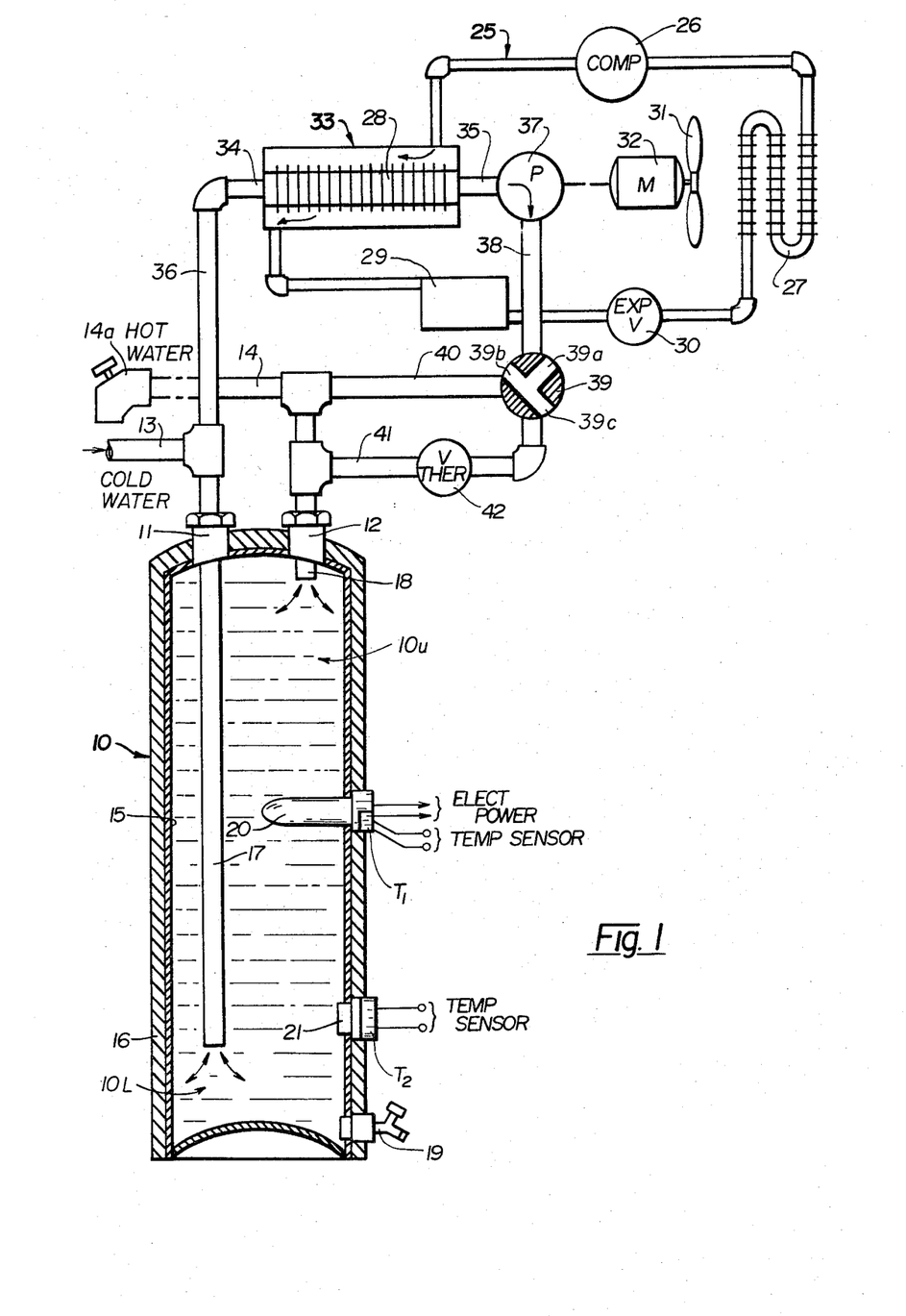
FIG. 1 is a schematic diagram of a water heating system embodying this invention and incorporating a water circulating pump driven by an electric motor.

Having reference to FIG. 1, a preferred form of the invention is shown as interconnected into a residential hot water system. This system, as associated with the residence, is only shown as including a hot water storage tank indicated generally at 10, having respective inlet and outlet couplings 11 and 12 for interconnecting the tank with the water utilization system. That water utilization system is shown in FIG. 1 as including a cold water conduit 13 and a hot water conduit 14. It will be understood that those conduits 13 and 14 are interconnected in the customary manner with the cold water conduit receiving water from a pressurized source, such as a city water system, and the hot water conduit 14 connecting with the various hot water utilization devices, such as an outlet faucet 14a that may be included within a residence, but which are not otherwise structurally shown.

The hot water storage tank 10 is preferably of the glass lined type for resistance to corrosion and has a steel shell 15 of a size having sufficient capacity for the particular residence. Also, a tank of this type is provided with an exterior thermal insulating sheathing 16 to enable the tank to better maintain an attained water temperature. The cold water inlet coupling 11 connects with a vertically extending pipe 17, generally termed a dip tube, that is of a length to have the bottom discharge end thereof opening in a lower region or zone 10L adjacent to the bottom of the tank. The objective of this construction is to route incoming cold water to the bottom of the tank to begin the heating process. The hot water outlet coupling 12 is connected to a relatively short connecting pipe 18 which functions as a hot water withdrawal tube operative to take water from an upper region or zone 10L of the water tank. Lower and upper indicate that one zone is at a higher elevation than the other and that the zones are generally related to the bottom and top of the tank, but it will be understood that this terminology does not limit the intended meaning to specific tank locations. The two inlet and outlet couplings 11 and 12 are normally provided in the upper end wall of a storage tank for convenience of interconnection to the piping system found in residences and which is normally carried at the ceiling or upper region of the room within which the heater or storage tank is located. A tank of this type is also normally provided with a valved drain pipe 19 which is located closely adjacent to the bottom of the tank. This valved drain pipe does not have any function with the system as shown in FIG. 1, but is noted merely for completeness of description.

Figure 2:
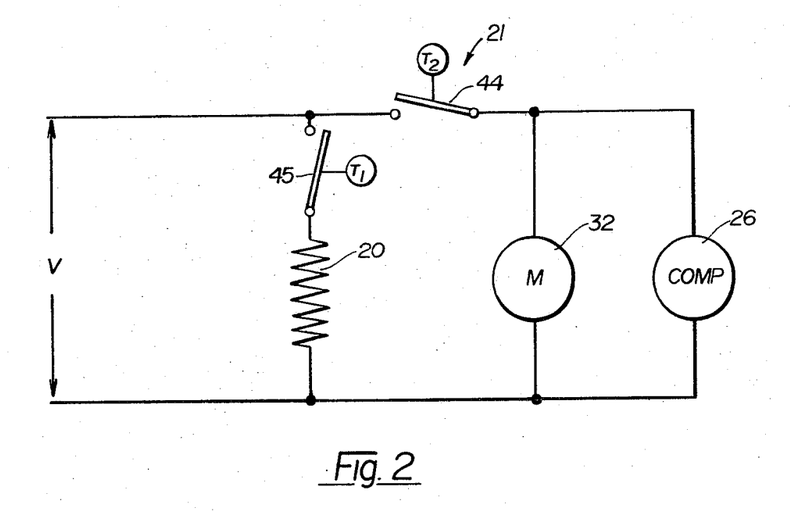
FIG. 2 is a schematic disgram of the electrical control circuitry for the water heating system of FIG. 1.

While it is the intention of this invention to provide a heat pump type system which is normally capable of providing the hot water heat requirements in a residence, it will also be understood that there may be times when the heat pump system is inoperative or relatively ineffective due to environmental conditions of ambient air temperatures. Accordingly, an auxiliary or secondary heat source is preferably provided to maintain continuity of operation in providing of hot water to meet the requirements of that particular residence. In the illustrative embodiment, as shown in FIG. 1, the auxiliary heating system comprises an electrical resistance heater 20 which is constructed to include a structural housing adapted to be secured in fixed relationship to the steel shell 15 of the water tank. This heater 20 is preferably located in the upper zone 10L of the tank and is provided with appropriate electrical conductors for interconnection in an electrical power circuit and is also provided with a temperature sensor or thermostatic electrical switch T1. These electrical connections are only diagrammatically illustrated in FIG. 1, but the interconnection will be further explained in conjunction with the electrical control circuitry. A second temperature sensing device 21 incorporating a thermostatic electrical switch T2 is also provided and this second device is secured in the steel shell 15 of the water tank at a lower region of the tank. It also includes electrical connections for interconnection into the control circuitry as shown in FIG. 2 and which will be explained in greater detail.

In accordance with this invention, a closed loop heat pump system, generally designated by the numeral 25, is provided to produce the heat that is required for elevating and maintaining the temperature of the water at the desired point. This heat pump system is of the refrigerant type and includes a compressor 26, an evaporator 27 and a condenser 28. In a heat pump system of the illustrated type, the evaporator serves as the means for obtaining heat from a heat source which is the surrounding air. These components are interconnected by fluid conduits and include the additional components of a liquid collector 29 and an expansion valve 30. To improve operation of the evaporator 27 in this system, an electric motor driven fan 31 is positioned in close proximity to that structure. This fan is driven by an electric motor 32, but the electrical connections thereto are not illustrated in FIG. 1. Similarly, the electrical connections to the compressor are not shown, but the basic controls therefor are shown in the schematic electric circuit diagram of FIG. 2.

Figures 5, 6:
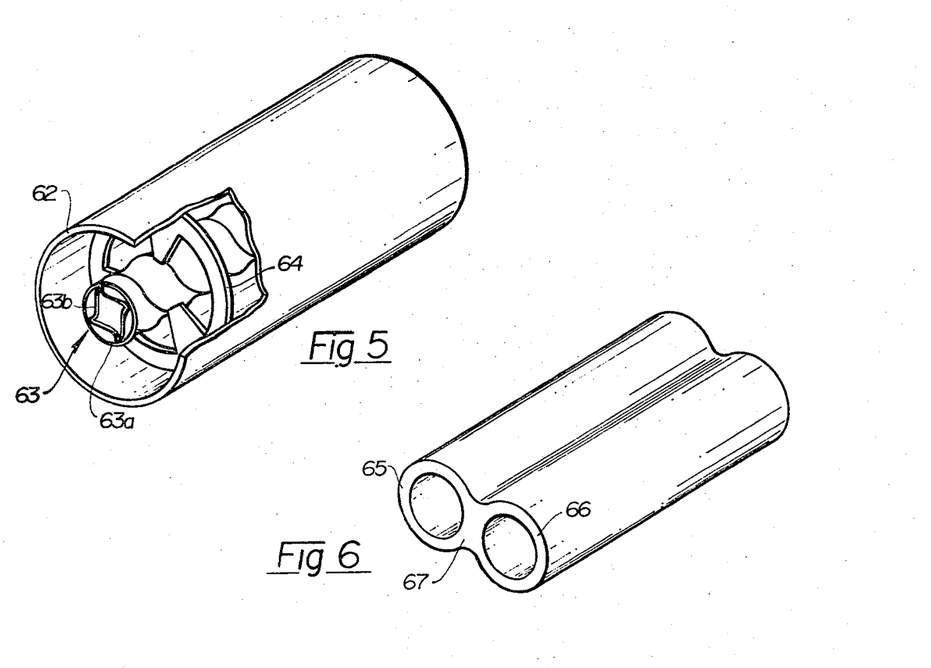
FIG. 5 is a perspective view of a fragmentary portion of a leak-safe heat exchanger having portions of the outer tube broken away for clarity of illustration.
FIG. 6 is a perspective view of a fragmentary portion of another form of a leak-safe heat exchanger.
Figure 7:
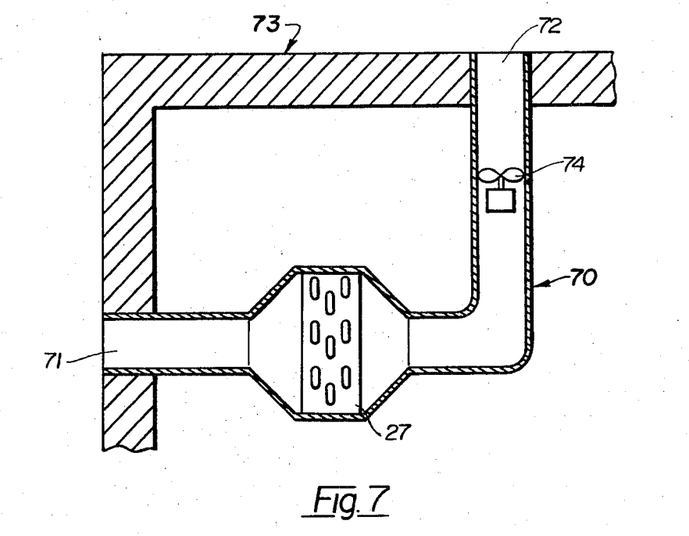
FIG. 7 is a diagrammatic sectional view of a ducted evaporator air system for the heat pump.

The condenser 28 is incorporated in heat exchanger 33 and is of a construction such that there will be little likelihood of any contamination of the water due to leaks developing within the apparatus. The specifics of construction of such a heat exchanger in each of two embodiments are shown in FIGS. 6 and 7 with those embodiments being described in detail in subsequent paragraphs to provide a more complete description of illustrative embodiments of this invention. At this point, it will suffice to note that the heat exchanger 33 has respective water inlet and outlet water connections 34 and 35. These connections thus result in a counterflow of the water through the heat exchanger as compared to the flow of refrigerant fluid as contained within the heat pump system.

The particular type of refrigerant that is utilized in the heat pump system 25 will depend on the specific design considerations of a particular installation. However, in a conventionally designed system, the refrigerant would be of a type such that the system would result in capability to develop a water temperature of the order of 140° F.

In accordance with this invention, a more advantageous transfer of heat from the heat pump system 25 into the water is achieved through a positive flow, water circulating system. This water circulating system forms a closed loop of conduits which are interconnected with the water tank 10 through the inlet and outlet couplings 11 and 12 of the water tank. In the illustrative embodiment it will be seen that the specific connections are actually made into the cold and hot water conduits 13 and 14 to facilitate the mechanical interconnection of a system unit embodying this invention with a conventionally available water heater tank. With this arrangement, it is only a matter of simplified plumbing to interconnect the water circulating conduit of an integrally constructed unit to the tank and water conduits 13 and 14. This water circulating conduit thus comprises a first section 36 which interconnects between the cold water conduit 13 and the inlet connection 34 to the heat exchanger 33. Continuing the water circulation path, it will be seen that the outlet connection 35 is coupled to a water pump 37 which has its outlet connected to another conduit section 38. Driving of the pump 37 may be conveniently effected through mechanical interconnection with the electric motor 32 that also drives the evaporator fan 31. It is an objective of this invention to arrange the various components for making a compact, integral assembly, thus providing of the one motor for operation of two components will minimize the space requirements as well as reduce manufacturing costs and operating expense.

A manually operated, three-way valve 39 is provided in the illustrative embodiment to permit alternate selection of either of two modes of operation and has an inlet coupled with the conduit section 38 and each of two outlets connected with respective conduit sections 40 and 41. These two conduit sections 40 and 41 are connected in parallel relationship and have ends interconnected into the hot water conduit 14. Interposed in the one conduit section 41 is a thermostatically controlled valve 42 which, in accordance with this invention, is designed and set to open whenever the water in the circulating system, after passing through the heat exchanger 33, reaches a predetermined temperature such as 140°. Obviously, the particular temperature set point for operation thereof is determined in accordance with a specific water heating system and in accordance with the type of heat pump system with which it is utilized.

A three-way valve such as the illustrative valve 39 has a movable valving element diagrammatically indicated to be of a rotary type, although spool-type valves with an axially reciprocable spool are also available and utilizable for three-way flow control. Referring to the diagrammatically illustrated valve 39, it will be noted that this valve's rotary element is provided with an internal fluid-flow passage of T-shaped configuration having the three ports designated as 39a, 39b and 39c. In a first position which is illustrated, none of these ports are connected with any of the conduit sections 38, 40 or 41, and no fluid will flow through the valve in any direction or into or out of any conduit section connected therewith. For operation of the system in a first mode, as will be described in further detail, the rotary element of the three-way valve 39 would be rotated to a second position to align port 39a with conduit section 38 and align port 39b with conduit section 40, thus permitting water flow from conduit section 38 into conduit section 40. In the second position, valve 39 blocks conduit section 41 and that section, in effect, is omitted from the system. For operation of the system in a second mode, as will be described in further detail, the rotary element of the three-way valve 39 would be rotated to a third position to align port 39b with conduit section 38 and align port 39c with conduit section 41, thus permitting water flow from conduit section 38 into conduit section 41. In this third position, valve 39 blocks conduit section 40 and that section, in effect, is omitted from the system.

The function of the three-way valve 39 is to permit operation of the FIG. 1 system in either of the two modes as noted in the preceding paragraph. The first mode of operation is with the valve 39 set to route the water from the heat exchanger 33 through conduits 38 and 40 into the hot water system conduit 14, and being entirely returned to the water tank 10 when no hot water is being utilized. This is the basic situation when it is assumed that the temperature of the water in the tank in the region of the temperature sensor 21 is below the minimum desired temperature and the sensor functions to activate the system for heating of the water. When no hot water is being utilized, water circulation induced by the pump 37 is an upward flow from the bottom or lower zone 10L of the tank, through the dip tube 17 and into the heat exchanger 33 via the inlet connection 34 and conduit section 36. After passage through the heat exchanger 33, the water exits through the outlet connection 35 and into the pump 37 from which it is discharged into conduit section 38 and then flows through valve 39 and conduit section 40 into the hot water conduit 14. With no hot water being utilized, the water then flows into the top or upper zone of the tank via the coupling 12 and there will be no water flow through the hot water conduit to or through a utilization device such as the illustrative faucet 14a. This particular mode of operation results in the water being circulated from the storage tank in a continuous manner at a predetermined rate of flow such that the temperature thereof will be incrementally increased, but which may not be increased to the ultimately desired hot water temperature by one pass through the heat exchanger. Operation in this mode provides the greater operational efficiency because of the substantially greater average differences in temperature that are encountered throughout an operating cycle.

Operation in the first mode described in the preceding paragraph is slightly modified when hot water flows through the hot water system conduit 14 to a utilization device, which utilization device may comprise a faucet that is merely opened to permit an outflow of water. It will be noted that an outflow of water through the conduit 14 will be accompanied by an equal quantity inflow of water through the cold water conduit 13. It will be further noted that where only a small quantity of hot water is used and, assuming that the temperature of the water in the tank 10 was at the maximum desired, the temperature of the water in the tank may not drop to a level in the region of the temperature sensor 21 to cause the system to become functionally operative. In that specific situation, cold water merely flows into the bottom of the tank via the dip tube 17 and hot water flows out of the top of the tank and into the hot water conduit 14 via the outlet coupling 12.

However, if the quantity of hot water used is sufficient to cause lowering of the water temperature in the region of the temperature sensor 21 to a point where the sensor will operate and activate the system to heat water, then there will be a slightly modified flow pattern while there is a concurrent use of hot water and a water heating operation. In this concurrent operation, cold water will not only flow into the tank via the dip tube 17, but will flow through conduit 36 and into the heat exchanger 33. A direct short circuit of the tank 10 is not provided by the heating system as the pump 37 will prevent a direct flow of cold water to the hot water conduit 14. Water will flow through the heat exchanger 33 at a rate determined by the pump 37 (flow rate also being a function of conduit size) and this water will absorb heat, thus resulting in an elevation of its temperature prior to its entering the hot water conduit 14 via conduit section 40.

Figure 3:
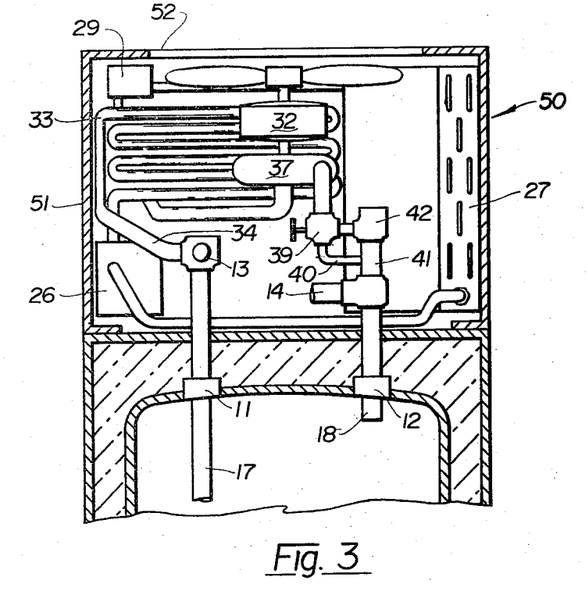
FIG. 3 is a diagrammatic vertical sectional view of a structural unit incorporating the components of the system shown in FIG. 1.

Since the objective is to obtain hot water at the utilization device, the water heating systen is obviously designed to avoid having the heating function in this first mode of operation significantly decrease the temperature of the water flowing out through the hot water conduit. Accordingly, the system is designed so that the flow of water through the heating system will be at a rate in relationship to the absorption of heat as the water flows through the heat exchanger 33 such that the water flowing through conduit 40 into the hot water conduit 14 will not result in a significant decrease in the temperature of the water flowing out of the top of the tank 10. It will be noted that the water heating system, as specifically illustrated structurally in FIG. 3 and the structure being diagrammatically illustrated in FIG. 1, has conduits that are substantially smaller than the hot water conduit 14 and thus the concurrent inflow of water through conduit section 40 will only represent a small portion of the water flowing through conduit 14 and will be mixing therewith so as to affect its temperature, particularly for a maximum flow condition where outflow of water from the hot water conduit 14 at a utilization device is substantially uninhibited. It will be readily apparent that as the rate of flow in conduit 14 to a utilization device decreases from a maximum, the effect of water flowing through conduit section 40 into conduit 14 will have a proportionally increasing effect. This concurrent heating and utilization will clearly result in widely varying effect on the temperature of the water flowing through conduit 14 to a utilization device; but, recognizing the substantially lesser flow rate capability of the heating system and the fact that this is only a transitory type operation, it is obvious that such operation does not have a significant bearing on the usual operating situation. This usual operating situation is that a certain quantity of water will be used within a relatively short period of time and then the water heating system will continue to operate over a greater period of time to heat the cold water that has been drawn into the tank 10.

The other or second mode of operation, with the valve 39 set as described in a preceding paragraph to route water through the conduit section 41 and thus under control of the thermostatic valve 42, provides better operation in the sense that a more rapid recovery of at least portions of the water within the storage tank can be achieved. This relatively more rapid recovery is obtained at the expense of thermal efficiency. Operation of the system in this mode is that the thermostatic valve is closed and prevents flow of water through the circulating system until such time as the water in conduit sections, 35 and 38, that portion of conduit section 41 in flow preceding relationship to the thermostatic valve and heat exchanger 33 reaches the ultimate or maximum desired water temperature. At this point, the thermostatic valve 42 will open and permit a flow of water until the temperature of the water in the conduit sections and heat exchanger has dropped to a predetermined lower temperature. At that point, the thermostatic valve again closes and prevents further water flow until the water now contained within the conduit sections 35, 38, 41 and the heat exchanger 33 again attains the ultimate desired hot water temperature with this cyclic operation being repetitive. This cyclic operation will continue until the temperature of the water in the tank 10, as sensed by the temperature sensor 21, will have increased to the maximum desired temperature and the sensor will function to terminate operation of the water heating system.

Operating in this second mode is advantageous as compared to the first mode operation during those times when hot water is being withdrawn through the hot water conduit 14 and the water heating system is functioning as a consequence of operation of the temperature sensor 21. In this situation, water will not flow through conduit 41 and into the hot water conduit 14 unless it has been first heated to at least the minimum desired temperature. The thermostatic valve 42 is operational to prevent a flow of water into the hot water conduit 14 except in accordance with the cyclic operation of that valve opening when the water in the conduit 41 at the inlet side of the thermostatic valve is at or above the upper operating temperature and closing when that water temperature is lower than the lower operating temperature of the thermostatic valve. Consequently, during concurrent heating and utilization of water in this second operating mode, there will not be any significant effect on the water being withdrawn through the hot water conduit 14 as a result of the water heating system's operation.

Functional control over the operation of the illustrative system in FIG. 1 is achieved through a relatively simplified electrical circuit as is shown in FIG. 2. That circuit includes the combination water pump and fan motor 32 and the refrigerant compressor 26 of the heat pump system. These two elements are parallel connected and are under the direct control of a switch contact 44 of the thermostatic switch T2 that is incorporated in the temperature sensor 21. It will be seen that the one terminal of the switch contact 44 is also series connected with a normally closed switch contact 45 which in turn is connected to a suitable source of electrical power. Thus, in normal operation of a system as shown in FIG. 1 wherein the heat pump heating system provided by this invention is adequate to meet the hot water requirements, the entire control of operation is under the control of the temperature sensing device 21. As water is withdrawn by a heat utilization device through the hot water conduit 14, additional cold water will be drawn into the storage tank through the inlet coupling 11 and the dip tube 17. This results in the temperature of the water in the lower zone of the storage tank 10 dropping and, if it drops below the minimum temperature set point of the thermostatic switch, resulting in operation of the thermostatic switch T2 to close its contact 44 and complete an electrical circuit to the motor 32 and compressor 26. This initiates operation of the system to result in generation and transfer of heat to the water in the storage tank 10. As the heat pump system 25 functions in its customary manner, the pump 37 will continuously circulate water relative to the storage tank by withdrawal through the dip tube 17 and return of the water, when heated, to the tank 10 though the withdrawal conduit 18. Thus, in this mode of operation, the cold water which had been brought into the storage tank as a consequence of utilization of hot water withdrawn from the upper zone of the tank, will then be drawn by the pump 37 through the circulating water system where it is heated in the heat exchanger and then returned to the upper region of the tank. This circulation of the water, utilizing either mode of operation as selected by the three-way valve 39, will continue until such time as the water within the bottom zone of the storage tank 10 will have again increased to the desired temperature level as detected by the sensing device 21. When that temperature level is reached, the contact 44 of the thermostatic switch T2 will open and de-energize both the motor 32 and the compressor 26 to terminate operation of the heat pump water heating system as provided by this invention.

Whenever the water demands are such that the outflow of hot water is at a rate or of a quantity such that the heat pump system is incapable of providing the desired rate of recovery, then the illustrated system automatically functions to continue operation of the heat pump system and to then also utilize the auxiliary or secondary electrical resistance heater 20. This change in operation results when the temperature of the water in the tank 10 100 at the elevation of the thermostatic switch T1 in the upper region reduces to or below a predetermined temperature which is the lower operating set point of the thermostatic switch and results in actuation of thermostatic switch T1 associated with the resistance heater. This thermostatic switch device includes a switch contact 45 which is normally open. The resistance heating element of the heater 20 is series connected with the normally open contact 45 and thus will be energized as a consequence of operation of the thermostatic switch T1 in closing that contact.

As previously noted, it is an important objective of this invention to provide a water heating system which can be incorporated in a compact, unitary assembly suitable for direct mounting on the top of a conventional water heater. A typical arrangement of the components is diagrammatically illustrated in FIG. 3. In that Figure, only the upper portion of a water tank 10, as previously described, is shown and carries on its upper end an assembled heat system unit 50. This assembled unit 50 includes a structural mounting shell or housing 51 that is adapted to be secured to the upper end of the water heater 10. Incorporated within the shell 51 are the various components of the system as previously described in conjunction with FIG. 1 with the same components being indicated by the same numerals. Accordingly, it will be seen that included within the shell is an evaporator 27 of the heat pump system which is also interconnected with a refrigerant compressor 26. These two components are interconnected by appropriate conduits and are also interconnected to the heat exchanger 33. This heat exchanger 33 is advantageously of the type which is described and known as a tube-within-a-tube type having connections at each end for respective couplings into the water system and also the refrigerant system and provides for coaxial flow of the water and refrigerant therethrough. Supported within the shell 31 is the electric motor 32 which is mechanically coupled to and supports the fan 31 and causes the circulation of air through the heat exchanger 27 and then up through an opening 52 in the top of the shell 51. The shell 51 thus effectively forms a ducted air system with the upper open end of the shell. Mechanically coupled to the opposite end of the motor 32 is the water pump 37 having its inlet and outlet interconnected to the heat exchanger 33 and to the valve 39. The outlets of valve 39 are connected to the direct by-pass conduit 40 and the thermostatic valve conduit 42 which are in turn connected to the hot water conduit 14.

Figure 4:
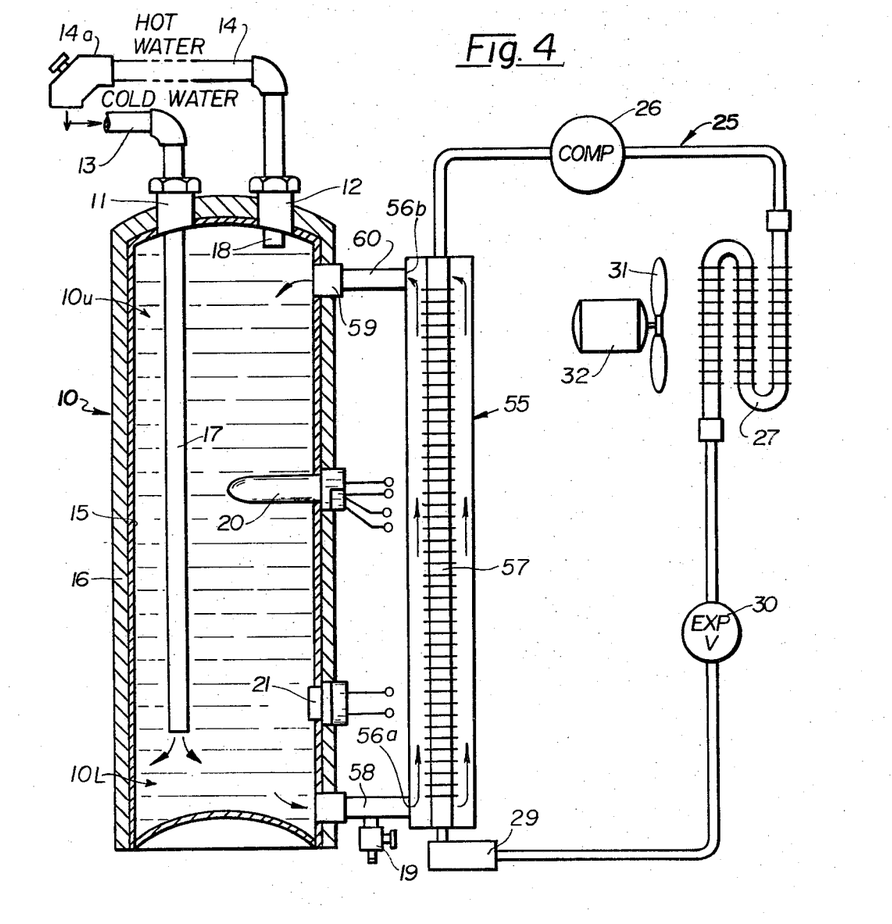
FIG. 4 is a schematic diagram of a modified water heating system embodying this invention.

A modified form of the invention is shown in FIG. 4 and will be seen to differ from that shown in FIG. 1 only in respect to the elimination of the electric motor driven water circulating pump. However, a water circulating system is provided in the system of FIG. 4 and comprises an elongated heat exchanger 55 of a tube-in-tube type disposed in a generally vertically extending position and which is operative to thermally induce a circulation of water as between the heat exchanger and the water storage tank 10. Components of this system which are the same as those included in the system shown in FIG. 1 are designated by the same numerals. This diagrammatically illustrated heat exchanger 55 includes first and second sections, 56 and 57, respectively, with the second section 57 being the condenser in the heat pump system 25. The first section 56 is diagrammatically shown as a tubular shell through which the condenser, or section 57, axially extends. The first section 56 of the heat exchanger 55 has a water inlet 56a connected to a conduit 58 which may be conveniently coupled with the tank 10 via the drain at the bottom of the tank with the drain pipe 19 being interconnected therewith. The first section 56 has an outlet 56b at its upper end either connected to a tank coupling or fitting 59 located in the uppermost end of the storage tank by means of a conduit 60, as illustrated, or to the hot water conduit 14 as in the FIG. 1 system. Because of the substantial temperature differential obtained in the heat exchanger 55, a substantial and effectively positive water flow will be achieved by the heat exchanger to perform the same objectives and functions as the motor driven pump 37 in the case of the system of FIG. 1. This heat exchanger 55 is also preferably of the tube-in-tube type, or dual coaxial tube construction wherein the tubes are not greatly different in diameter with a relatively small amount of water being contained in the exchanger and routed therethrough at any particular instant. Such a structural arrangement results in a more effectively induced thermal flow as a consequence of the substantial temperature differential that can be produced between the upper and lower ends of the heat exchanger. It will also be noted that the heat pump system 25 is connected with the heat exchanger 55 so that that hot refrigerant enters the top thereby resulting in maintenance of a greater temperature differential throughout the length of the heat exchanger and thereby enhancing efficiency of operation.

A first structural configuration of a leak-safe heat exchanger that is considered suitable for use in a water system is shown in FIG. 5. This heat exchanger which is of a tube-in-tube type comprises an elongated outer tube 62 having an elongated double wall tube 63 coaxially disposed therein. The double wall tube 63 may be formed from two interfitting tubes 63a and 63b which have convoluted surfaces that minimize mechanical interengagement as between the two tubes, but sufficient contact to provide mechanical support and effective heat conduction. This double wall construction minimizes the possibility of a leak as it is unlikely both tubes will simultaneously develop a leak. Suitable support spacers 64 are provided to maintain the outer tube 62 in coaxial relationship to the double wall tube 63, but permit fluid flow therethrough. Suitable end connections (not shown) are provided to permit interconnection of the heat exchanger in the system. Preferably, refrigerant is caused to flow in the outer tube 62 while the water is caused to flow in the double wall tube in the opposite direction.

A second structural configuration of a leak-safe heat exchanger that is also considered suitable for use in a water system is shown in FIG. 6. This structure comprises two separate tubes 65 and 66 that are disposed in spaced parallel relationship, but which are mechanically secured together, as for example, by direct brazing 67 or by a mechanical connector. The brazing not only forms the mechanical interconnection, but forms the heat conductive path. Again, suitable end connections (not shown) are provided to permit interconnection of the heat exchanger in the system.

In some instances, it may be more advantageous to utilize a ducted air system in conjunction with the heat pump system compressor and evaporator. Such a system is diagrammatically illustrated in FIG. 7 with only the evaporator 27 being shown. The evaporator 27 is shown as incorporated within a duct system 70 having inlet and outlet openings 71, 72 communicating through an exterior wall section 73 of a building structure. A fan 74 is also included in the duct system 70 to induce air flow with this fan possibly being driven by the motor 32 which also drives the water circulating pump 37 in the system of FIG. 1. This arrangement enables the evaporator to obtain heat from the exterior of the residence in those instances where it is of a more critical nature and utilization of heat generated within the residence such as for heating purposes would be detrimental to the residence's heat system requirements. Usually, however, the water heater does not have such extremely high heat requirements as would materially affect any residential heating system. It will also be apparent that the ducted type system would have a limited usefulness in case of installations in relatively cold climates since a heat pump is only effectively operable at or above certain predetermined temperatures. Consequently, the type of installation that is utilized will depend on the ambient temperature conditions that are likely to be encountered.

It will be readily apparent from the foregoing description of the illustrative embodiments of this invention that a particularly advantageous water heating system is provided having a heat pump system functioning solely as a heat source for heating of water. The system is capable of achieving a greater performance efficiency through the inclusion of a water circulating conduit interconnected with a water storage tank and a heat exchanger that is coupled with the heat pump system. Circulation of water through the heat exchanger can be induced either by a motor driven pump or by thermally induced currents to assure that a circulation will be maintained to better effect a transfer of heat in the heat exchanger.

Having thus described this invention, what is claimed is:

1. A water heating system for interconnection into a water system having a pressurized cold water source and a hot water utilization device comprising
   a water storage tank with relatively lower and upper zones therein and having first conduit means for interconnecting said tank in series flow relationship in the water system to permit inflow of cold water to said tank at said lower zone and outflow of water from said tank at said upper zone in response to requirements of a utilization device, and
   water heating means including second conduit means connected in fluid flow relationship with said storage tank, fluid flow inducing means coupled with said second conduit means in operative relationship for effecting circulation of water therethrough from the lower to the upper zone of said tank, and a closed loop heat pump system including heat obtaining means positionable in heat transferring relationship to a heat source to derive heat therefrom and control means responsive to the water temperature in the storage tank to control operation of said water heating means, said second conduit means and said heat pump system interconnected for effecting a transfer of heat only to water circulating through said second conduit means.

2. A water heating system according to claim 1 wherein the flow inducing means is a fluid pump.

3. A water heating system according to claim 2 wherein said second conduit means includes a thermally controlled valve responsive to the temperature of the water in said second conduit means and operable to only permit flow through said second conduit means when the water therein is heated to at least a predetermined temperature.

4. A water heating system according to claim 3 wherein said second conduit means includes a first circuit section having said thermally controlled valve interconnected therein, a second circuit section connected in parallel fluid flow relationship to said first circuit section, and flow control means interconnected in circuit with said first and second circuit sections and selectively operable to alternatively connect one of either said first or said second circuit section in operative fluid flow relationship in said second conduit means.

5. A water heating system according to claim 4 wherein said flow control means is a fluid valve selectively operable to connect either said first or said second circuit sections in fluid flow relationship in said second conduit means.

6. A water heating system according to claim 1 wherein said fluid flow inducing means includes heat exchanger means, said heat exchanger means including first and second sections maintaining water in the first section thereof separate from but in heat transferring relationship to a fluid in said second section, said first section having an inlet and an outlet connected in fluid flow relationship in said second conduit means to receive water from the lower zone of said tank at said inlet and to discharge water from said outlet to the upper zone of said tank whereby thermal convective currents generated by heating of water in the first section of said heat exchanger will induce a circulatory flow of water between said tank and heat exchanger.

7. A water heating system according to claim 6 wherein said heat exchanger first section comprises an elongated, fluid conducting chamber disposed in vertically extending relationship with the inlet and an outlet thereof relatively disposed in vertically spaced relationship.

8. A water heating system according to claim 1 which includes a leak-safe heat exchanger condenser interconnecting said second conduit means and the other components of said heat pump system.

9. A water heating system according to claim 8 wherein said heat pump system includes an evaporator disposed in heat transferring relationship with a heat source fluid, and means for inducing circulation of the heat source fluid relative to said evaporator.

10. A water heating system according to claim 9 wherein said flow inducing means is a fluid pump, said means for inducing circulation of the heat source fluid includes a fluid impeller, and said heat pump system includes single drive means mechanically coupled with said pump and impeller for concurrent driving thereof.

11. A water heating system according to claim 1 which includes second water heating means disposed in heat transferring relationship to the water in said tank and energized by a respective energy source, and control means coupled with said first mentioned water heating means and said second water heating means and operable to permit simultaneous operation thereof.

12. A water heating system according to claim 11 wherein said first control means includes first temperature sensing means responsive to water temperature in said lower zone in said tank and operable to effect operation of said first mentioned water heating means whenever the water temperature in said lower zone is less than a first predetermined temperature, and second water temperature sensing means responsive to water temperature in said upper zone in said tank and operable to effect operation of said second water heating means and to permit operation of said first mentioned water heating means whenever the water temperature in said upper zone is less than a second predetermined temperature, said upper zone being disposed vertically above said lower zone.

13. A water heating system according to claim 12 wherein said second water heating means is disposed in heat transferring relationship to water in said tank in said upper zone.

14. A water heating system according to claim 1 wherein said second conduit means of said water heating means includes a refrigerant conduit for the flow therethrough of a refrigerant fluid of the heat pump system, said refrigerant conduit included in a heat exchanger through which water flows in a relatively opposite direction to the flow of refrigerant.

15. A water heating system according to claim 7 wherein said storage tank has a substantial vertical extent and said lower and upper zones are vertically disposed therein, and said second conduit means is connected with said tank with the inlet and outlet of said first heat exchanger section connected to said tank in fluid flow relationship at said lower and upper zones, respectively, whereby water may flow from the lower zone and into the upper zone through said first heat exchanger section.

16. A water heating system according to claim 1 wherein said first and second conduit means have a common fluid communicating connection with said storage tank and are in parallel flow relationship to each other.

* * * * *